United States Patent
Engeler et al.

[11] Patent Number: 6,153,159
[45] Date of Patent: Nov. 28, 2000

[54] METHOD FOR PURIFYING EXHAUST GASES

[75] Inventors: Werner Engeler, Meine; Dieter Neyer, Wolfsburg; Martina Kösters; Diethard Hesse, both of Hanover, all of Germany

[73] Assignee: Volkswagen AG, Wolfsburg, Germany

[21] Appl. No.: 09/138,877

[22] Filed: Aug. 24, 1998

Related U.S. Application Data

[63] Continuation of application No. PCT/EP97/00881, Feb. 24, 1997.

[30] Foreign Application Priority Data

Mar. 1, 1996 [DE] Germany ............... 196 07 862

[51] Int. Cl.$^7$ ................ B01J 8/00; B01J 8/02; B01D 47/00
[52] U.S. Cl. .............. 423/213.2; 423/210; 423/212; 423/235; 423/245.1; 423/245.3; 423/246; 423/247
[58] Field of Search ................. 423/210, 212, 423/213.2, 235, 245.1, 245.3, 246, 247

[56] References Cited

U.S. PATENT DOCUMENTS

| | | | |
|---|---|---|---|
| 4,755,499 | 7/1988 | Neal et al. | 502/415 |
| 4,798,711 | 1/1989 | Neal et al. | 423/239 |
| 4,849,274 | 7/1989 | Cornelison | 428/116 |
| 4,940,569 | 7/1990 | Neal et al. | 423/239 |
| 4,980,040 | 12/1990 | Lichtin et al. | 204/157 |
| 5,240,682 | 8/1993 | Cornelison et al. | 422/174 |
| 5,362,463 | 11/1994 | Stiles et al. | 423/239.1 |
| 5,388,406 | 2/1995 | Takeshima et al. | 60/297 |
| 5,402,641 | 4/1995 | Katoh et al. | 60/285 |
| 5,406,790 | 4/1995 | Hirota et al. | 60/276 |
| 5,633,217 | 5/1997 | Lynn | 502/439 |
| 5,665,321 | 9/1997 | Campbell et al. | 423/210 |
| 5,702,675 | 12/1997 | Takeshima et al. | 423/213.5 |

FOREIGN PATENT DOCUMENTS

| | | | |
|---|---|---|---|
| 2137175 | 6/1995 | Canada | B01J 37/08 |
| 4320218 | 7/1994 | Germany | B01D 53/36 |
| 9109823 | 7/1991 | WIPO | C07B 63/00 |

*Primary Examiner*—Steven P. Griffin
*Assistant Examiner*—Eileen E. Nave
*Attorney, Agent, or Firm*—Baker Botts L.L.P.

[57] ABSTRACT

Thermal catalysts, particularly catalysts coated with precious metals, are used to reduce the concentration of CO, HC and NOx in exhaust gases from internal-combustion engines. While catalysts coated with precious metals exhibit catalytic activity from about 140° C., to ensure very low emission levels thermal catalysts need to be heated during cold starting so that the pollutants produced during the cold start react. The specification discloses a catalyst with a photocatalytic semiconductor illuminated with UV light for this purpose. Suitable for use as the photocatalytic material is e.g. titanium dioxide. This enables pollutant levels to be reduced immediately after the engine has been started and even at relatively low ambient temperatures. The invention is suitable for use with diesel engines and lean-mixture spark-ignition engines.

17 Claims, 4 Drawing Sheets

METHOD FOR PURIFYING EXHAUST GASES

REFERENCE TO RELATED APPLICATION

This application is a continuation of International Application No. PCT/EP97/00881 filed Feb. 24, 1997.

BACKGROUND OF INVENTION

This invention relates to methods and arrangements for catalytic conversion of oxides of nitrogen, hydrocarbons, and carbon monoxide in exhaust gases from internal combustion engines.

To reduce carbon monoxide (CO), hydrocarbons (HC) or oxides of nitrogen (NOx) in exhaust gases of internal combustion engines, precious-metal coated catalysts have chiefly been used. As a catalytically active coating, platinum is superior to other metals because platinum is catalytically active for converting CO and HC even at low temperatures of about 140° C. The catalytic action of platinum is stable over a long period, and is not substantially impaired by migration of the platinum, even at high exhaust gas temperatures. The primary action of a Pt catalyst, e.g. $Pt/Al_2O_3$, is the oxidation of CO and HC to $CO_2$ with simultaneous NOx reduction. The catalytic reduction of NOx, depending on the catalyst used, has a comparatively high dependence on temperature, and the maximum NOx reduction rate may be at temperatures below 200° C.

German Offenleggungsschrift No. 3642018 discloses a catalyst on a zeolite base for catalyzing the reaction of nitrogen oxides with hydrocarbons. The conversion of the nitrogen oxides is dependent on the hydrocarbon concentration in the exhaust gas to be treated, with only 50% reduction of the nitrogen oxides achieved at an NOx:HC ratio equal to 1. Such a zeolite catalyst may also be combined with conventional precious metal catalysts used as oxidation catalysts.

One problem with such catalysts, especially thermal catalysts, is that NOx may be partly converted into the ozone-damaging greenhouse gas $N_2O$.

An increase in NOx conversion, although not avoiding $N_2O$ formation, may be achieved by a selective catalytic reduction (SCR) process using ammonia or urea as a reducing agent. The SCR process is only conditionally suitable for use with non-stationery engines, because, owing to the changing modes of operation of the engine, the danger of an $NH_3$ release arises upon establishment of a 100% NOx reducing agent stoichiometry. In addition, during non-stationary operation, besides the catalyst, the ammonia or urea must be entrained in the exhaust gases.

At exhaust gas temperatures below 140° C., the catalysts described above are essentially inactive. To provide exhaust gas purification during engine warm-up, adsorption of the pollutant components for example on a zeolite is used. The adsorbed pollutant component from the exhaust, for example, NOx, is desorbed from the zeolite surface at exhaust temperatures of about 200° C. and passed to a precious metal catalyst which is active at that temperature for conversion. The problem in this case is the need to regenerate the zeolite surface, which must be ensured for long-term stability. In particular, potential zeolite surface poisoning presents a difficulty for this mode of exhaust gas purification.

SUMMARY OF THE INVENTION

Accordingly, it is an object of the present invention to provide a method and arrangement for purifying exhaust gases which overcomes the disadvantages of the prior art.

Another object of the invention is to provide a method and arrangement for catalytic conversion of nitrogen oxides in the exhaust of an internal combustion engine even at low temperatures.

These and other objects of the invention are attained by subjecting the exhaust gas to a semiconductor photocatalyst together with oxygen and illuminating the photocatalyst.

By using the invention, a reduction in the concentration of at least one of the components NOx, HC, and CO in the exhaust of an internal combustion engine is achieved, the exhaust gas components to be reduced being converted on a photocatalyst positioned in the exhaust stream. The reaction, which takes place in the presence of oxygen, is especially effective with respect to the components $N_2$, $CO_2$ and $H_2O$. In contradistinction to thermal catalysis, photocatalysis is employed in the present invention, semiconductors, in particular photosemiconductors, being employed as the catalyst. The photoactivity of the semiconductor with respect to the exhaust gas components is preferably achieved by excitation with a light of wavelength $\lambda \leq 600$ nm, in particular $\leq 410$ nm, the wavelength $\lambda$ being dependent on the particular photosemiconductor used. Suitable catalysts or catalytically active substances for use in the invention are, in particular, oxides of the transition metals and/or of the rare earths, but also for example, $Sb_2O_4$. The metal oxides may be present in mixed compounds, for example as titanates. Especially suitable are $TiO_2$, ZnO, $SrTiO_3$, $ZrO_2$, $Sb_2O_4$, $CeO_2$. The semiconductor may or may not be doped, for example with Group VIII metals, e.g. Pt, Rh and/or Ru. This especially improves the oxidation properties of the catalysts.

The reaction preferably takes place in the presence of at least 0.5 vol. %, desirably at least 1 vol. % of $O_2$, a temporary absence of oxygen doing no harm to the catalyst but leading to a definitely poorer NOx conversion. In other words, the reaction takes place especially well in the exhaust gases of Diesel engines or lean-mix (Otto) engines. The invention is particularly suitable when non-stationary engines are employed, i.e. internal combustion engines which have variations in operating conditions such as engine speed and load. In addition to NOx, HC and/or CO are also converted according to the invention, these components reinforcing the NOx conversion. The photocatalytic exhaust conversion according to the invention may be combined with use of conventional thermal catalysts, the conventional catalysts being located either before or after the photocatalyst, depending on the purpose. In the case of Diesel engines, in an especially preferred embodiment, the photocatalytic exhaust gas purification is preceded by an oxidation catalyst, in particular one based on precious metals, for example platinum, and/or a particle filter, employment of the oxidation catalyst being especially economical. As a result, adhesive carbon particles are removed from the exhaust gas flow before photocatalysis, so that the irradiation of the photocatalyst is not interfered with excessively by carbon particles. It has been found that, with oxidation catalysts, there is such a degradation of the hydrocarbons adhering to the carbon particles that the particles are liner and less adhesive, so that the light emission from the radiation source is not impeded by the carbon.

The exhaust can be passed over the photocatalyst in various ways. One possible arrangement passes the exhaust gases through a powder containing the photocatalyst, the powder being suspended in a fluidized bed by the exhaust gas flow. In this case the illumination may come from either or both the outside and the inside of the fluidized bed. This mode of catalytic conversion is suitable especially for stationary operation of internal combustion engines.

Another possibility for contacting the exhaust gas flow with a photosemiconductor is to provide the photosemiconductor as a porous solid bed through which the exhaust gas flow is passed. Here again, the illumination may be from without or within. In an especially preferred embodiment, the photocatalyst is present as a layer over which the exhaust gas flow passes and which is illuminated through the exhaust gas flow. Preferably the photocatalyst here is applied to a supporting structure. In this case, the photocatalyst advantageously has as large a surface area as possible. In this embodiment, the illumination may be either transverse to the exhaust gas flow, in the direction thereof, or else contrary to that direction, the latter modifications being employed in the case of a tubular structure. In an alternative arrangement, the photocatalyst is in the form of plates disposed at spaced internals, so that the exhaust gas flow is passed between the plates. In that arrangement, the illumination may be either transverse or parallel with respect to the exhaust gas flow.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
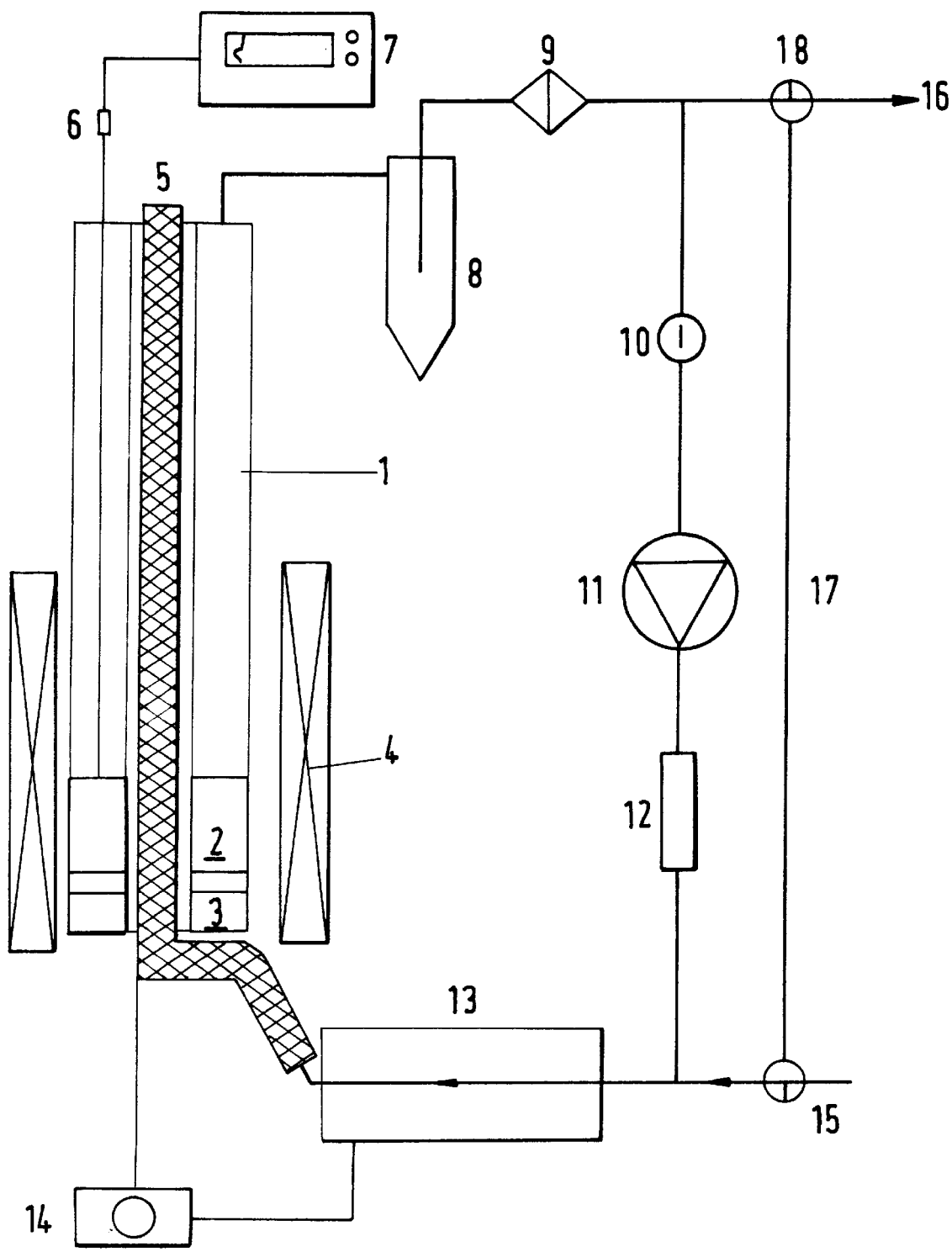
FIG. 1 is a schematic diagram illustrating the arrangement of a representative fluidized bed exhaust gas purification system.

The representative embodiment of the invention shown in FIG. 1 includes an annular-gap fluidized bed reactor 1 suitable for NOx conversion for treatment and detoxification of exhaust gases from internal combustion engines used in stationary operation, or alternatively, as a small appliances. This arrangement is used to analyze and screen the photoactivity of semiconductor photocatalysts with respect to NOx, HC and CO conversion. For comparison purposes, the screening is done with a standard synthetic exhaust gas as described below instead of using exhaust gases from an internal combustion engine.

Around the annular-gap fluidized bed reactor 1, which is made of a temperature-resistant glass transmissive to UV light, six UV luminescent lamps are arranged with a reflection jacket in the form of a lamp jacket 4. A heating strip 5, positioned in the interior of the annular-gap fluidized bed reactor 1, serves to keep the gas passed through the reactor at the desired temperature. The annular gap of the fluidized bed reactor 1 is closed at the bottom by a gas-transmissive impact tray 3 over which a semiconductor containing 1 g titanium dioxide is disposed as a photocatalyst material. The titanium dioxide is of a type suitable for photocatalytic reactions and has a high BET surface area of about 300 m$^2$/g. In photocatalysts employed according to the invention, surface areas from 50 m$^2$/g up are acceptable in principle. The titanium dioxide material 2 is present as an agglomerated powder.

The reaction gas is passed by a supply line 15 through a furnace 13 and through the impact tray 3 into the annular gap of the fluidized bed reactor 1. By providing a continuous return of a portion of the reacted gas flow to the fresh gas with a two-way valve 10, the gas flow velocity in the annular gap of the fluidized bed reactor 1 is enhanced so that the desired depth of the bed of fluidized material 2 is maintained as a homogeneous fluidized bed. For this purpose, the returned gas passes through a diaphragm pump 11 and a flowmeter 12. The gas passed through the reactor goes through a cyclone 8 to separate any entrained catalyst particles and then through a filter 9. After the filter 9, the gaseous mixture is removed through a three-way valve 18 and a line 16 to a quadruple mass spectrometer and an FTIR spectrometer.

The titanium dioxide is present in the catalyst predominantly in the anatase modification and has a band gap from 3.06 eV to 3.23 eV. Thus, the absorption edge is in the UV A-interval. The reaction gas used in the reactor tests was adjusted to a volume flow of 500 ml/minute and had the following composition:

300 ppm NO 300 ppm propene 6 vol. % oxygen remainder nitrogen

The measuring operation was performed in five steps:

a.) Adjustment to a constant volume flow and determination of the gas composition by way of a bypass 17;

b.) Turning the three-way valves 15 and 18 to pass the stream of gas through the reactor, which had previously been flushed with nitrogen;

c.) After adjustment to a steady state of the gas concentration at the reading station, the gas was passed through the reactor for 15 hours with UV radiation;

d.) The lamp 4 was turned off;

e.) After adjusting the stationary gas concentration at the reading station, the flow of gas was diverted through the bypass 17.

Figure 4:
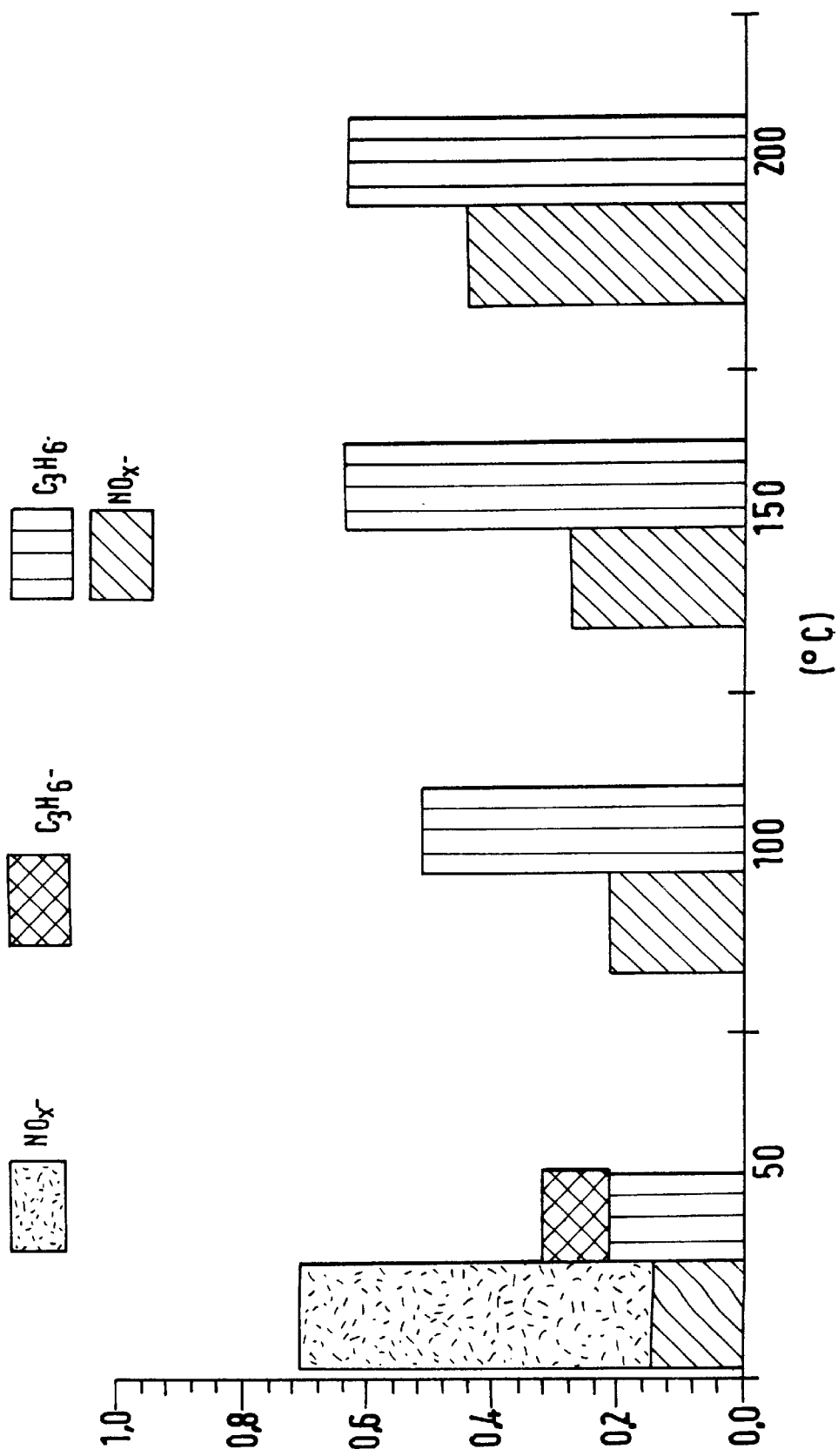
FIG. 4 is a bar graph representation showing the conversion of various exhaust gas components at different temperatures.

The measuring operation was repeated with the same catalyst material at controlled synthetic gas temperatures of 50°, 100°, 150° and 200° C. The results are shown in FIG. 4. According to these tests, there is a continuous increase in conversion of NOx and propene with temperatures in the illuminated region rising linearly with increasing temperature of the synthetic gas from 15% NOx and 22% propene to 38% NOx and 81% propene. At the same time, NOx is reduced almost entirely to $N_2$ and $O_2$, and 80% of the reacted propene is oxidized to $CO_2$. During the illumination stage, the reaction of NOx attains a maximum of 76% at only 50°, with 32% propene conversion. This confirms the efficacy of the photocatalytic conversion.

Figure 2:
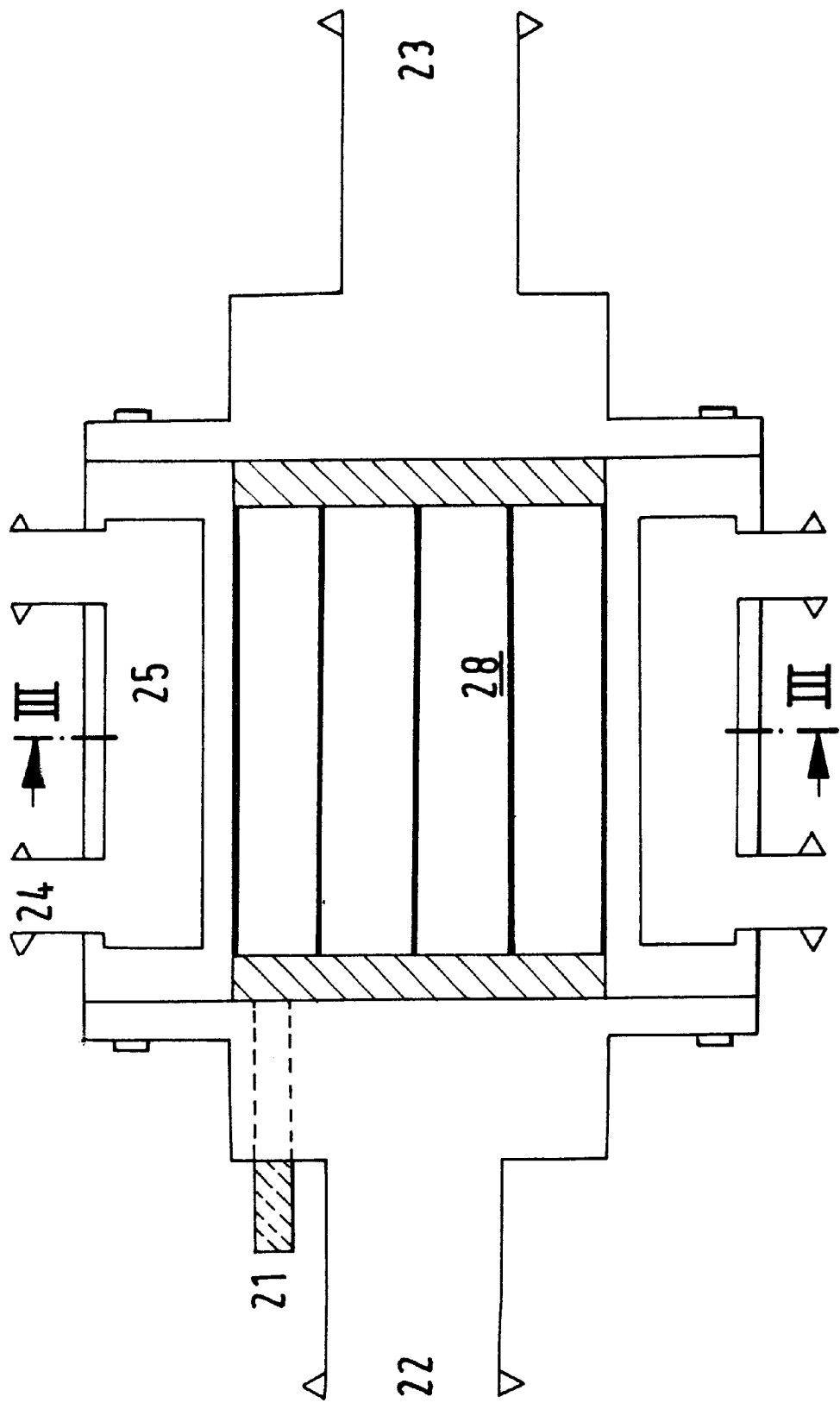
FIG. 2 is a longitudinal section illustrating an arrangement for gas purification by parallel plates.
Figure 3:
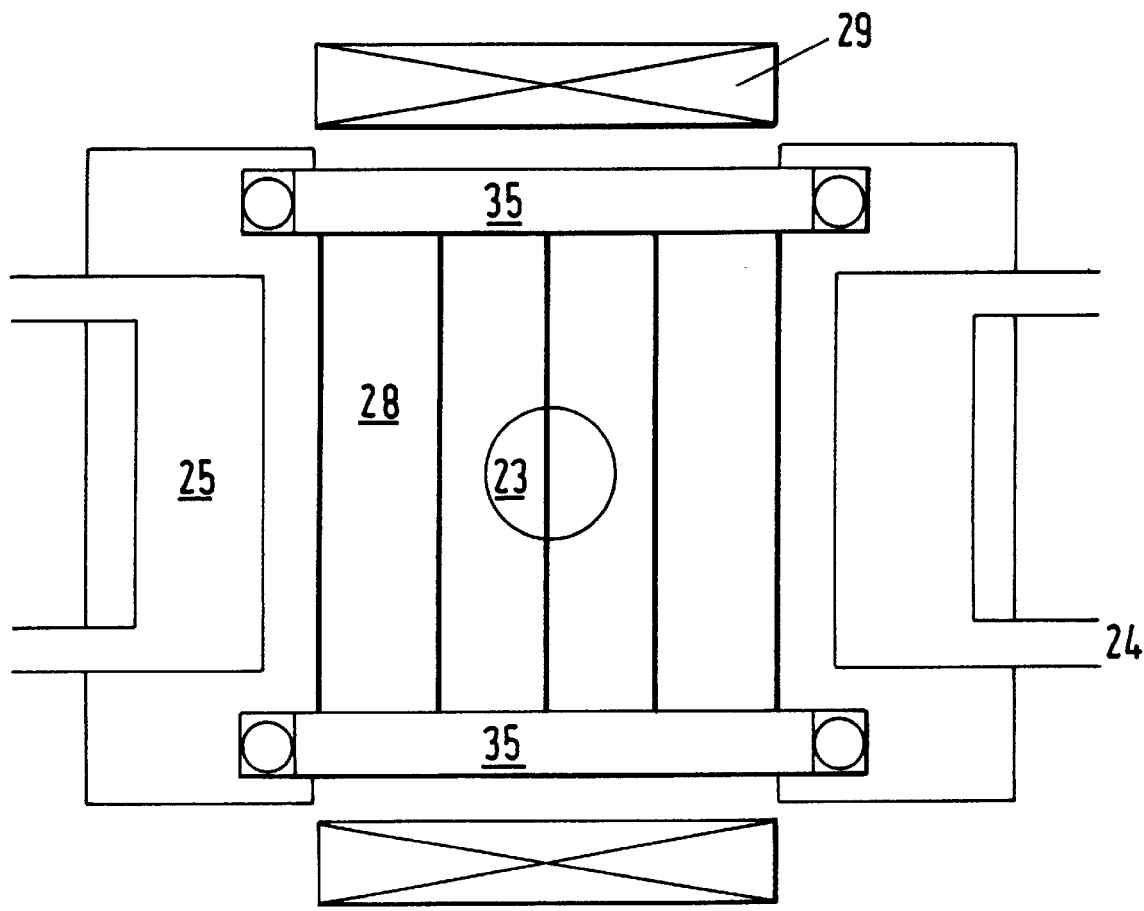
FIG. 3 is a cross-sectional view showing the plate arrangement of FIG. 2 in a section transverse to the direction of gas flow.

In order to permit photocatalysis to be used under the non-stationary conditions in the exhaust of an Otto or Diesel engines, the semiconductor must be immobilized. The catalyst shown in FIGS. 2 and 3 has a plate structure containing catalyst supporting plates 28 coated with the catalyst material i.e., titanium dioxide. As shown in FIG. 3, the spacing of the plates 28 is fixed so that as large an areas as possible is optimally irradiated with UV light. The UV light comes through quartz glass plates 35 from reflector lamps 29 arranged above and below the plates 28, in a direction transverse to the gas flow. The exhaust gas, deriving from an internal combustion engine (not shown), flows through an exhaust gas system (not shown) to the air inlet 22, along the plates 28, and to an outlet 23. The exhaust then flows on in the system in the usual way, in particular to a muffler. A thermocouple 21 is provided to check the catalyst temperature, the catalyst housing is provided with cavities 25 capable of receiving a heating medium through inlets and outlets 24, so that a desired heating of the catalyst is achieved by heating of the entire housing.

The invention is especially suitable for non-stationary Diesel and lean-mix (Otto) engines in motor vehicles.

Although the invention has been described herein with reference to specific embodiments, many modifications and variations therein will ready occur to those skilled in the art. Accordingly, all such variations and modifications are included within the intended scope of the invention.

We claim:

1. A method of catalytic conversion of $NO_x$, HC and/or CO in an exhaust gas system of an internal combustion engine comprising supplying exhaust gas components from an internal combustion engine together with $O_2$ to a passage extending between spaced surfaces supporting a photocatalyst containing $TiO_2$ for reaction with the $TiO_2$ photocatalyst and directing catalyst-activating illumination from a location outside the passage into the passage in a direction extending between the spaced surfaces to activate the photocatalyst during the reaction.

2. A method according to claim 1 wherein the photocatalyst is a photosemiconductor.

3. A method of catalytic conversion of HC and/or CO contained in an exhaust gas in an exhaust gas system of an internal combustion engine comprising supplying exhaust gas components from an internal combustion engine together with $O_2$ to a passage extending between spaced surfaces supporting a photocatalyst for reaction with the photocatalyst and directing catalyst-activating illumination from a location outside the passage into the passage in a direction extending between the spaced surfaces to activate the photocatalyst during the reaction.

4. A method of catalytic conversion of NOx, HC and/or CO in an exhaust gas system of an internal combustion engine comprising supplying exhaust gas components from an internal combustion engine together with $O_2$ to a passage extending between spaced surfaces supporting a semiconductor photocatalyst which contains a transition metal for reaction with the photocatalyst and directing catalyst-activating illumination from a location outside the passage into the passage in a direction extending between the spaced surfaces to activate the photocatalyst during the reaction.

5. A method according to any of claims 2 to 4 wherein the photocatalyst includes materials from the group consisting of oxides of transition metals and rare earths.

6. A method according to any of claims 2 to 4 wherein the photocatalyst is selected from the group consisting of ZnO, $TiO_2$, $SrTiO_3$, $ZrO_2$, $Sb_2O_4$ and $CeO_2$.

7. A method according to any of claims 2 to 4 wherein the photocatalyst contains a transition metal and/or an oxide of a transition metal.

8. A method according to any of claims 1–4 wherein the illumination has a wave-length $\lambda \leq 600$ nm.

9. A method according to any of claims 1–4 wherein at least 0.5 vol. % oxygen is contained in the exhaust gas.

10. A method according to any of claims 1–4 wherein the exhaust gas contains NOx and oxygen, and HC and/or CO.

11. A method according to any of claims 1–4 wherein the exhaust gas is received from a Diesel combustion engine or a lean mix Otto engine.

12. A method according to any of claims 1–4 wherein the operation of the internal combustion engine is non-stationary.

13. A method according to any of claims 1–4 wherein the photocatalyst is preceded by an oxidation catalyst.

14. A method according to any of claims 1–4 wherein the photocatalyst has a carrier structure, with a coating active for catalytic conversion applied thereto.

15. A method according to claim 14 where the coating is a surface coating.

16. A method according to claims 14 wherein the exhaust gas is passed over the coating.

17. A method according to claim 16 wherein the direction of the illumination is selected from a direction of illumination transverse to the exhaust gas flow, a direction of illumination toward the exhaust gas flow, and a direction of illumination against the exhaust gas flow.

* * * * *